March 19, 1946.  H. R. ELLINWOOD  2,396,836
CONDUIT SUPPORTING BLOCK
Filed Jan. 23, 1942  2 Sheets-Sheet 1
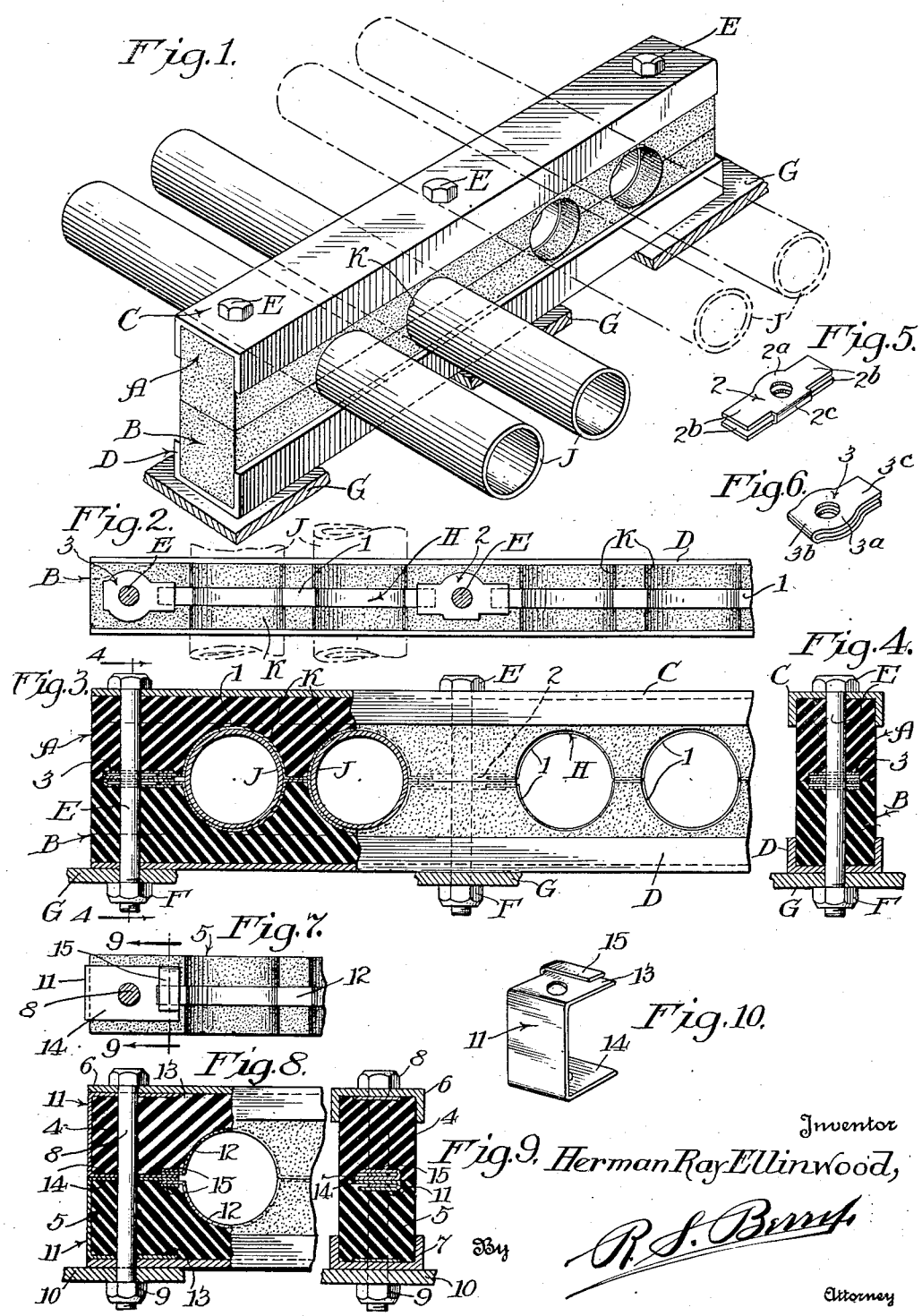

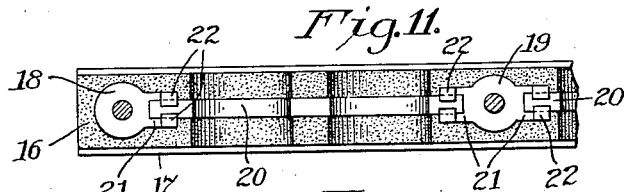
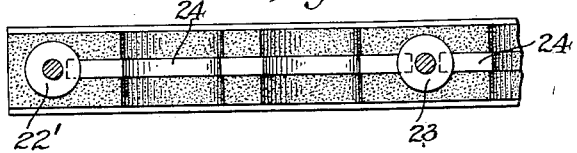
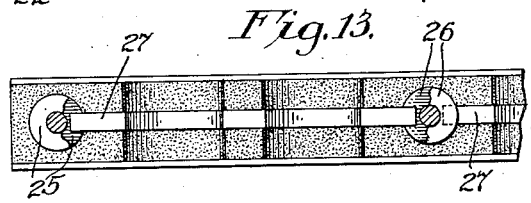
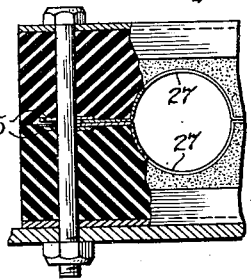
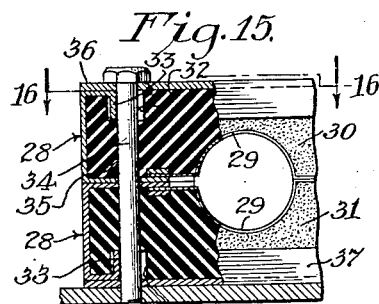
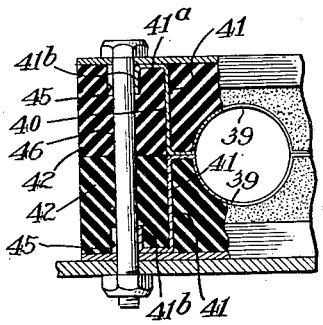
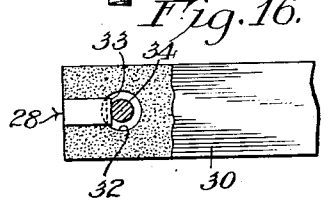
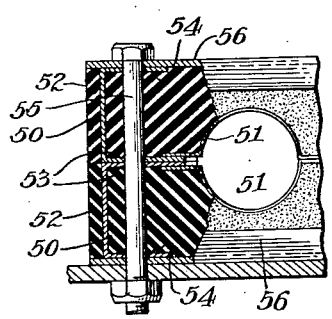

Patented Mar. 19, 1946

2,396,836

UNITED STATES PATENT OFFICE 2,396,836

CONDUIT SUPPORTING BLOCK

Herman Ray Ellinwood, Burbank, Calif., assignor to Adel Precision Products Corp., Burbank, Calif., a corporation of California Application January 23, 1942, Serial No. 427,881

2 Claims. (Cl. 174—135)

This invention relates to improvements in conduit supports of the type exemplified in the United States Letters Patent No. 2,227,528, issued January 7, 1941, to Paul W. Adler, the purpose of such supports being to secure a group of metallic aircraft conduit lines between vibration absorbing cushions of elastic insulation material having metallic clamping means and electrical bonding strips associated therewith respectively for clamping said cushions and electrically bonding the conduits to the metal framing of the aircraft to eliminate dangerous and objectionable static electricity.

The present invention relates more particularly to the means for electrically bonding or "grounding" the conduit lines, especially the construction of the metallic bonding strips and the arrangement thereof relative to the cushions, metal backing members for the cushions, and bolts for clamping the cushions in place and securing the block to a metallic structural part of an aircraft.

One of the objects of the present invention is to provide a conduit supporting block of the character described in which the bonding strip and opposed elastic cushions are constructed and arranged so that the cushions will form an effective seal preventing oil, gasoline, or other liquids and gases from gaining access to and causing corrosive, electrolytic or other impairment of the bonding strip.

Another object of my invention is to provide a supporting block of the character described wherein the bonding strip is narrower than heretofore and so constructed and arranged that the opposed cushions have comparatively wide abutting marginal portions forming an effective enclosure for and substantially hermetically sealing the strip to protect it against corrosion and electrolytic attack as hereinbefore noted.

A further object of my invention is to provide a supporting block such as described wherein the bonding strip is electrically bonded to the metal backing members on the cushions or the bolts or to both the backing members and bolts in such manner as to securely hold the strip in place and prevent damage and derangement thereof in assembling the block also during its use.

Another object of my invention is to provide a supporting block such as described in which the effectiveness of the bonding strip is increased and assured throughout the period of use of the block by reason of bonding strip sections being joined and equipped with washer-like or similar apertured terminal members and connectors through which the clamping bolts extend and which make it unnecessary to provide bolt receiving openings in the bonding strip.

With the foregoing objects in view, together with such other objects and advantages as may subsequently appear, the invention is carried into effect as illustrated by way of example in the accompanying drawings, in which:

Fig. 1 is a perspective view of a conduit supporting block embodying my invention;

Fig. 2 is a fragmentary top plan view of half of the block;

Fig. 3 is a fragmentary sectional side elevational view of the block as when clamped and secured in place;

Fig. 4 is a sectional view taken on the line 4—4 of Fig. 3;

Fig. 5 is a perspective view of one of the connectors for the sections of the bonding strip;

Fig. 6 is a perspective view of one terminal member for the bonding strip;

Fig. 7 is a fragmentary top plan view of a modified form of the invention;

Fig. 8 is a fragmentary sectional side elevational view of the form of block shown in Fig. 7;

Fig. 9 is a sectional view taken on the line 9—9 of Fig. 7;

Fig. 10 is a perspective view of the terminal member employed in the form of the invention shown in Figs. 7, 8 and 9;

Figs. 11, 12 and 13 are fragmentary top plan views, each showing a modified form of the invention;

Fig. 14 is a fragmentary sectional side elevational view of the construction shown in Fig. 13;

Fig. 15 is a fragmentary sectional side elevational view of another modified form of my invention;

Fig. 16 is a fragmentary sectional view taken on the plane of line 16—16 of Fig. 15;

Figs. 17 and 18 are respectively fragmentary sectional side elevational views of other modified forms of the invention.

Referring to the drawings more specifically, it is seen that my invention generally includes opposed cushions or sections A and B of resilient insulation material, rigid metallic backing channels C and D astride the outer edges of said cushions, bolts E and nuts F for clamping the cushions together and securing the device to a metallic structural part G of an aircraft, and bonding means H for electrically bonding the group of conduits J to the metal structure G.

As here shown the cushions are rectangular and have complementary transverse grooves or channels K in their opposed edges or faces for reception of the conduits J whereby the conduits will have cushioned seats to absorb vibrations and are closely embraced and held securely in place by the cushions.

As shown in Figs. 1 to 4 inclusive, the bonding means H and the cushions A and B and associated elements are so related that the cushions are clamped on the conduits J with the marginal abutting portions of the cushions completely enclosing and substantially hermetically sealing those portions of the bonding means lying between the cushions, to prevent fluids from contacting the bonding means and electrolytically or otherwise attacking or impairing it. The bonding means H will become countersunk or pressed into the resilient cushions as particularly shown in Figs. 3 and 4 so that the portions of the opposite faces of the cushions surrounding the bonding means may come into close contact and seal the bonding means as aforesaid.

The grooves or channels K conform closely to and to an appreciable extent form seals around the conduits, particularly due to the wide marginal portions of the cushions afforded by the use of a comparatively narrow bonding medium.

As shown in Figs. 1 to 4 inclusive, the bonding means H includes a narrow flexible metallic strip 1 mounted on each cushion but it is obvious that I may use such a strip on but one of the cushions, if desired. These strips extend along the median longitudinal portions of the opposed faces of the cushions A and B and across the transverse grooves or channels K so that the portions thereof lying in the channels will directly contact the conduits for an effective electrical bond therewith, while at the same time affording a greater area of cushion in contact with the conduits and also forming a more effective seal than where relatively wide bonding strips are used.

As here shown each bonding strip is sectional and has its sections connected by means of an apertured connector 2, while at the terminals of the sections are affixed apertured terminal members 3. The connectors 2 and members 3 are of greater width than the strip so that the apertures therein may be large enough to accommodate the bolts E, it being noted that the strip is too narrow to permit of the extension of the bolts therethrough. However, the members 2 and 3 like the sections of the strip 1 have their margins spaced well inwardly from the margins of the opposed faces of the two cushions to afford the sealing provisions as hereinbefore noted.

The connector 2 as shown in Figs. 2 and 5 is made of a piece of thin sheet metal of the same or similar characteristics as the metal of the bonding strip 1, and which is doubled and bent into clamping engagement with the adjacent ends of the sections of the strip, and may be spot-welded or otherwise fixed thereto provided the strip sections are properly joined and an electrical bond maintained therebetween. The doubling of the connector 2 reinforces it and permits of a close fit of the bolt therewith and a good electrical connection of the bonding strip with the bolt, without mutilating the connector or the bonding strip. As shown in dotted lines in Fig. 3, the connectors 2 will become pressed into or embedded in the cushions so that they are enclosed and sealed thereby. The bonding of the strips 1 to the bolts E by means of the connectors 2 assures an effective bonding of the conduits J to the metal structure G with which the bolts engage as will be apparent in Fig. 3. This arrangement also electrically connects the metal backing members C and D with the bonding strip 1 and the conduits.

The connectors 2 have enlarged apertured body portions 2a in opposed relation and from which clamping tongues or lugs 2b extend for clamping therebetween the ends of the sections of the strip 1, there being a web 2c joining the body portions.

As shown in Figs. 2 and 6 the terminal members 3 are made of the same kind of sheet metal as the connectors 2 but are bent double to define opposed enlarged apertured body portions 3a joined at corresponding ends by a web 3b and provided at opposite ends with tongues or lugs 3c between which latter the ends of the strip 1 are clamped, welded, or otherwise secured. The doubling of the members 3 renders them adequately strong to assure a close fit and a good bond with the bolts which pass through the apertured body portions 3a. As shown in Fig. 2 the bent part of this connector clip is located between the end bolt E and the adjacent end of the elongated support, and the side portions of the clip at the opposite side of the bolt include between them and contact with the adjacent end portion of the bonding strip 1.

It will now be seen that the connectors 2 and the terminal members 3 make it possible to employ a relatively narrow bonding strip yet effectively bond the strip to the bolts and through the latter to the metallic backing members C and D whereby through the bolts and said backing members the conduits J will be bonded to the metal structure G.

The use of the narrow bonding strip, the connectors 2 and terminal members 3 makes possible relatively wide abutting portions of the opposed faces of the cushions A and B whereby the bonding strip and associated parts will be enclosed and effectively sealed against the access thereto of liquids or fluids which would cause corrosion or otherwise impair the bonding means. Moreover, a better cushioning action is afforded by the increased cushion area resulting from use of narrow bonding strips.

If the narrow strip were used without the more rugged and stronger connectors 2 and terminal members 3 it would not be possible to extend the bolts through apertures in the narrow strips, or if possible, would result in a tearing or derangement of such strip and defeat the bonding effect between the bolts and the strip.

As shown in Figs. 7, 8, 9 and 10, a modified form of my invention includes opposed cushions 4 and 5, rigid metallic backing members 6 and 7, bolts 8, and nuts 9, all identical with corresponding parts of the form of my invention shown in Figs. 1 to 4 inclusive, and secured to a metallic structure 10 in the same manner. This form differs as to the terminal members 11 which are secured to the ends of narrow metallic bonding strips 12. The strips 12 lie between and on the cushions in the same manner as shown in Figs. 1 to 4 but are directly contacted with and bonded to the backing members 6 and 7 as well as to the bolts 8. This contact with the backing members is made possible by making each of the terminal members 11 C-shaped, with terminal portions 13 and 14 thereof adapted to engage the backing members and bolts respectively. As here shown the C-shaped terminal members embrace the ends of the cushions 4 and 5 so that the terminals 13 thereof lie between the metal backing members 6 and 7 and the cushions, in contact with the backing members, whereas the terminals 14 of members 11 lie between the cushions in abutting relation to one another. The terminals 13 and 14 are apertured so that the bolts 8 will extend therethrough and effectively contact said terminals. Lugs 15 are provided on the terminals 13 of the members 12 for securing the ends of the bonding strip 12 thereto, and if desired the strip may be welded to members 11. In this form the bonding strip 12 is "sealed" between the cushions and protected in the same manner as shown in Figs. 1 to 4 inclusive.

Referring to Fig. 11, another form of my invention includes cushions 16, backing members 17 and all other parts as employed in the form of the invention shown in Figs. 1 to 4 inclusive, except that the apertured terminal members 18 and the apertured connectors 19 for the narrow bonding strip 20 have tongues 21 on each of which are two bendable lugs 22 for affixing the bonding strip thereto. The bonding strips may be welded to the members 18 and 19 if desired. The same "enclosure" and sealing effect as to the bonding means is present in this form as in the form shown in Figs. 1 to 4.

Fig. 12 shows a modified form of bonding means wherein the terminal members 22' and connectors 23 are similar to ordinary washers and have the sections of the narrow bonding strip 24 welded thereto. In this form, as in the form shown in Fig. 11, the bond is made with the bolts rather than directly with the backing members. The same sealing action is provided for in the modified form of Fig. 11 as in the other forms previously described.

Yet another washer type of bonding means is shown in Figs. 13 and 14 wherein the terminal members 25 are a pair of washers and the connectors 26 comprise a similar pair. The bonding strip sections 27 are welded between these washer connectors and terminal members. In all other respects this form is the same as that shown in Figs. 1 to 4 inclusive.

Figs. 15 and 16 show another modified form similar to the modification disclosed in Figs. 7 to 10 inclusive in that the terminals 28 are C-shaped and have the bonding strips 29 secured thereto in the same manner as shown in Figs. 7, 8 and 9. The cushions 30 and 31 have counterbores 32 and the ends 33 of the terminal members 28 are bent to lie in said counterbores. In inserting the bolts 34 through the bolt opening 35 in the cushions they will clear the inturned ends 33 without contacting and mutilating or deranging said ends due to the clearance afforded by the counterbores 32. However, when the cushions are clamped together and compressed the material thereof will flow so that the ends 33 of the bonding strip will be forced into close contact with the bolts as well as with the backing members 36 and 37, thereby providing a more effective bonding of the bonding strip to the bolts and backing members. In all other respects this form of my invention is the same as that shown in Figs. 7 to 10 inclusive.

Fig. 17 shows another modified form of my invention wherein the narrow bonding strips 39 have their terminal portions 40 extended through openings or slots 41 in the cushions 42 to dispose portions 41a between the cushions and metal and backing strips 43 with the free ends 41b of the latter extended into counterbores 45 in the bolt holes 46 in the same manner as shown in Figs. 15 and 16 except that the bonding strips do not extend around the ends of the cushions. When the cushions are under compression the material thereof forces the bonding strip ends 41b into contact with the bolts.

In Fig. 18 another modified form of my invention similar to the modification shown in Fig. 8, includes C-shaped terminal members 50 having the ends of sections of the bonding strips 51 welded or otherwise affixed thereto as shown in Fig. 7. In this form instead of the C-shaped members straddling the ends of the cushions 52 as shown in Figs. 7 and 8, said members are embedded in the cushions. However, the free end portions 53 and 54 of the C-shaped members are apertured and disposed for contact with the bolts 55 and the metal backing members 56 in the same manner as shown in Figs. 7 and 8. This mounting of the C-shaped members within the cushion provides for a complete sealing of the entire bonding means, it being noted that the bonding strip and said terminal members are comparatively narrow and fully enclosed by the cushions when the latter are clamped together as shown in Fig. 18.

It will now be apparent that I have provided a conduit supporting block which effectively "seals in" and protects the bonding strips and associated elements and also affords the advantages hereinbefore noted in a particularly efficacious manner by reason of the construction and arrangement of the bonding strips and associated elements.

I claim:

1. In a support for metallic conduits, opposed elongated cushions of insulation material having faces adapted to abut one another and provided with complementary conduit-receiving channels, a pair of rigid backing members between which said cushions are located, bolts for clamping said backing members and intervening cushions together under compression with the faces of the latter abutting, a flexible metallic bonding strip extending in section between the cushions and lying inwardly spaced from the margins of said faces with portions in contact with said conduits, a connector connecting spaced apart end portions of adjacent said bonding strip sections, said connector consisting of a piece of sheet metal doubled over to form two opposed side portions between which end portions of two adjacent sections of said bonding strip are gripped at least one of the aforementioned bolts passing through said connector and clamping said side portions of said connector against the intervening ends of the bonding strip.

2. In a support for metallic conduits, opposed elongated cushions of insulation material having faces adapted to abut one another and provided with complementary conduit-receiving channels, a pair of rigid backing members between which said cushions are located, bolts for clamping said backing members and intervening cushions together under compression with the faces of the latter abutting, a flexible metallic bonding strip extending in sections between the cushions and lying inwardly spaced from the margins of said faces with portions in contact with said conduits, a connector connecting spaced apart end portions of adjacent said bonding strip sections, said connector comprising at least two opposed pieces of sheet metal disposed on opposite sides of said bonding strip sections, at least one of the aforementioned bolts passing through said connector and clamping said side portions of said connector against the intervening ends of the bonding strip.

HERMAN RAY ELLINWOOD.